United States Patent
Yokota et al.

(10) Patent No.: US 10,107,963 B2
(45) Date of Patent: Oct. 23, 2018

(54) COAT REMOVING METHOD OF COATED OPTICAL FIBER

(71) Applicant: FUJIKURA LTD., Koto-ku, Tokyo (JP)

(72) Inventors: Kouichi Yokota, Sakura (JP); Manabu Tabata, Sakura (JP); Yoshiharu Kanda, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 15/434,209

(22) Filed: Feb. 16, 2017

(65) Prior Publication Data

US 2017/0160475 A1    Jun. 8, 2017

Related U.S. Application Data

(60) Division of application No. 13/947,686, filed on Jul. 22, 2013, which is a continuation of application No. PCT/JP2011/051244, filed on Jan. 24, 2011.

(51) Int. Cl.
*G02B 6/245* (2006.01)
*H02G 1/12* (2006.01)

(52) U.S. Cl.
CPC .............. *G02B 6/245* (2013.01); *H02G 1/126* (2013.01); *H02G 1/1256* (2013.01)

(58) Field of Classification Search
CPC .................................................... G02B 6/4497
See application file for complete search history.

(56) References Cited

U.S. PATENT DOCUMENTS

| 4,195,045 | A | 3/1980 | Mead |
| 5,481,638 | A | 1/1996 | Roll et al. |
| 6,273,990 | B1 | 8/2001 | Bookbinder et al. |
| 6,418,252 | B1 | 7/2002 | Maitland |
| 6,665,483 | B2 | 12/2003 | Gatica |
| 8,755,654 | B1 | 6/2014 | Danley et al. |
| 2002/0100356 | A1 | 8/2002 | Murakami et al. |
| 2003/0083724 | A1 | 5/2003 | Jog et al. |

FOREIGN PATENT DOCUMENTS

| CN | 1493009 A | 4/2004 |
| EP | 0544053 A1 | 6/1992 |

(Continued)

OTHER PUBLICATIONS

College Physics; https://www.chegg.com/homework-help/problem-returns-tightrope-walker-studied-example-46-created-chapter-5-problem-43pe-solution-9781938168932-exc; retrieved on Mar. 24, 2018; textbook published 2015 (Year: 2015).*

(Continued)

*Primary Examiner* — Francisco W Tschen
(74) *Attorney, Agent, or Firm* — Sughrue Mion, PLLC

(57) ABSTRACT

A coat removing method of removing a coat of a coated optical fiber 3 made of a glass fiber 3a and the coat of polyimide resin 3b covering the glass fiber 3a includes holding the coated optical fiber 3 with fiber clamps 5 and 7 at two locations spaced by a predetermined distance in a length direction of the coated optical fiber 3, applying tension to the coated optical fiber 3 in the length direction, pressing a coat removal blade 29 to the coated optical fiber 3 in the tension-applied state in a direction crossing the length direction, to bend the coated optical fiber 3, and moving the coat removal blade 29 in the length direction along the coated optical fiber 3 in the bent state, thereby removing the coat.

3 Claims, 3 Drawing Sheets

(56) References Cited

FOREIGN PATENT DOCUMENTS

| | | |
|---|---|---|
| JP | 2-5004 A | 1/1990 |
| JP | 8-114713 A | 5/1996 |
| JP | 11-84139 A | 3/1999 |
| JP | 2003-315562 A | 11/2003 |
| JP | 2010-164697 A | 7/2010 |
| WO | 02/073259 A2 | 9/2002 |

OTHER PUBLICATIONS

Communication dated Apr. 11, 2017, from the European Patent Office in counterpart European Application No. 11857393.0.
Communication dated Feb. 25, 2016, from the State Intellectual Property Office of the People's Republic of China in counterpart application No. 201180065402.4.
Communication dated Oct. 23, 2014 from the European Patent Office in counterpart application No. 11857393.0.
Communication dated Feb. 4, 2015 from the State Intellectual Property Office of the People's Republic of China in counterpart application No. 201180065402.4.
Communication dated Sep. 22, 2015 from the State Intellectual Property Office of the P.R.C. in counterpart application No. 201180065402.4.
International Search Report for PCT/JP2011/051244 dated Feb. 22, 2011.
Communication dated Jan. 7, 2016, issued by the European Patent Office in corresponding European Application No. 11 857 393.0.

\* cited by examiner

COAT REMOVING METHOD OF COATED OPTICAL FIBER

CROSS REFERENCE TO RELATED APPLICATION

This application is a Divisional of U.S. patent application Ser. No. 13/947,686, filed Jul. 22, 2013, which is a Continuation of PCT Application No. PCT/JP2011/051244, filed on Jan. 24, 2011.

TECHNICAL FIELD

The present invention relates to a coat removing method of a coated optical fiber and a coat removing apparatus of a coated optical fiber.

BACKGROUND ART

When manufacturing an optical fiber coupler, a coated optical fiber, i.e., an optical fiber covered with a coat must be subjected to a removal of the coat at an intermediate section of the coated optical fiber. As a method of removing the coat of such a coated optical fiber, there is known a blade-using mechanical technique such as one described in Japanese Unexamined Patent Application Publication No. 2010-164697.

The coat removing method mentioned above is carried out in a state that the coated optical fiber is held with a pair of clamps and is placed on a flat base. At this time, a removal blade for removing the coat is tilted at an acute angle with respect to the coated optical fiber and is moved toward the coated optical fiber until it comes in contact with the coated optical fiber. Thereafter, the removal blade is moved in a length direction of the coated optical fiber, to bite the coat of the coated optical fiber. This is carried out until an edge of the removal blade comes in contact with an outer circumferential face of the optical fiber in the coat. Thereafter, the removal blade is moved away from the optical fiber within a thickness range of the coat. With the edge being at the front in a moving direction, the removal blade is moved in the length direction of the coated optical fiber, thereby removing the coat.

CITATION LIST

Patent Literature

Patent Literature 1: Japanese Unexamined Patent Application Publication No. 2010-164697

SUMMARY OF INVENTION

Problem to be Solved by Invention

The blade-using coat removing method according to the above-mentioned related art employs the flat base to place the coated optical fiber thereon, or a table to receive the coated optical fiber. This causes the edge of the removal blade, when moved along the coated optical fiber, to strongly hit the optical fiber in the coat due to vibration of the removal blade or a parallelism error between the table and the moving direction of the removal blade. This will deteriorate the strength of the optical fiber.

When the edge bites the coat, the optical fiber is held between the edge and the table, and therefore, the movement of the removal blade must highly precisely be controlled with the use of, for example, a touch sensor. When the coat is made of polyimide resin such as the case of a submarine optical fiber cable, the coat is very thin, for example, 15 μm and is hard, and therefore, controlling the biting amount of the edge is very difficult.

Accordingly, an object of the present invention is to remove a coat without causing an edge to strongly hit an optical fiber in the coat or without highly precisely controlling a biting amount of the edge into the coat.

Means to Solve Problem

According to an aspect of the present invention, there is provided a coat removing method of removing a coat of a coated optical fiber having an optical fiber covered by a coat. The method includes holding the coated optical fiber with a pair of holders at two locations spaced by a predetermined distance in a length direction of the coated optical fiber, applying a predetermined tension to the coated optical fiber in the length direction, pressing a coat removal blade to the coated optical fiber in the tension-applied state in a direction crossing the length direction to bend the coated optical fiber, and moving the coat removal blade in the length direction along the coated optical fiber in the bent state, thereby removing the coat.

The tension applied to the coated optical fiber in the length direction and the bending amount of the coated optical fiber, i.e., the moving amount of the coat removal blade in the pressing direction with respect to the coated optical fiber may be adjusted to adjust load applied by the coat removal blade to press the coated optical fiber.

According to another aspect of the present invention, there is provided a coat removing apparatus for removing a coat of a coated optical fiber having an optical fiber covered by a coat with the use of a coat removal blade. The apparatus includes a pair of holders that hold the coated optical fiber at two locations spaced by a predetermined distance in a length direction of the coated optical fiber, a tension applying unit that applies tension in the length direction to the coated optical fiber held with the holders, a first moving mechanism that moves the coat removal blade in a direction crossing the length direction to press and bend the coated optical fiber tensioned by the tension applying unit, and a second moving mechanism that moves the coat removal blade in the length direction along the coated optical fiber bent by the first moving mechanism, thereby removing the coat.

One of the pair of holders may be fixed and the other may be movable in the length direction of the coated optical fiber. The tension applying unit may have a resilient element that pushes the movable holder in a direction away from the fixed holder.

It is possible to employ a third moving mechanism that turns the coated optical fiber around its axial line.

MODE OF IMPLEMENTING INVENTION

An embodiment of the present invention will be explained in detail with reference to the drawings.

Figure 1:
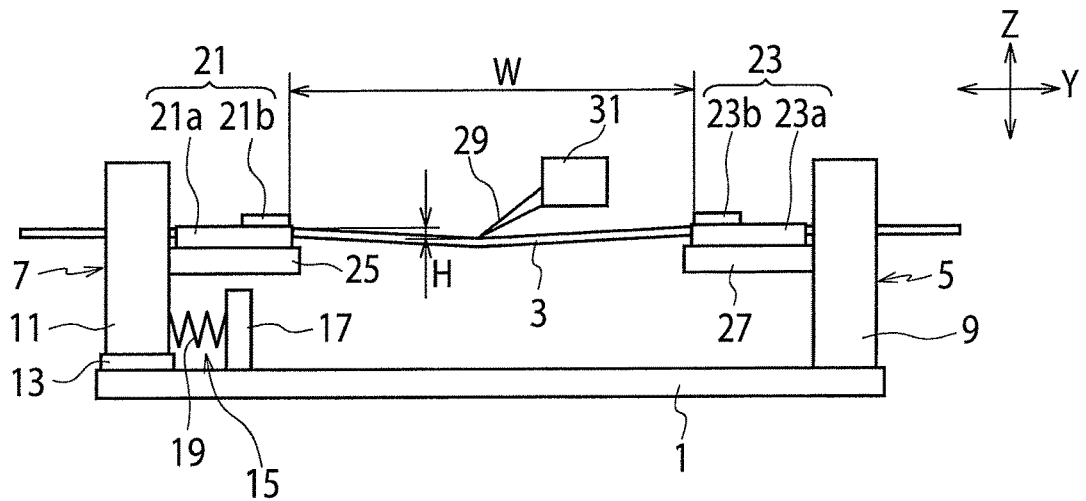
FIG. 1 is a front view of a coat removing apparatus according to an embodiment of the present invention.

As illustrated in FIG. 1, fiber clamps 5 and 7 spaced by a predetermined distance are arranged on the left and right sides of a base plate 1, to serve as the holders to hold a coated optical fiber 3 at two locations distanced away from each other in a length direction. The fiber clamp 5 on the right side of FIG. 1 has a base 9 fixed to the base plate 1. On the other hand, the fiber clamp 7 on the left side of FIG. 1 has a base 11 that is slidable relative to the base plate 1 through a slide bearing 13 in the length direction (a left-right direction in FIG. 1) of the coated optical fiber 3.

The slidable base 11 has a lower base provided with a tension mechanism 15 serving as the tension applying unit. The tension mechanism 15 includes a spring receiver 17 that is spaced from the base 11 and is fixed to the base plate 1 and a spring 19 that is interposed between the spring receiver 17 and the base 11 and serves as the resilient element to push the whole of the fiber clamp 7 in a direction (a leftward direction in FIG. 1) away from the fiber clamp 5.

Accordingly, the spring 19 biases the base 11, to apply tension in the length direction (the left-right direction in FIG. 1) to the coated optical fiber 3 held by the pair of fiber clamps 5 and 7.

Opposing upper parts of the bases 9 and 11 of the fiber clamps 5 and 7 are provided with fiber holders 21 and 23 to hold the coated optical fiber 3. The fiber holders 21 and 23 have seats 21a and 23a on each of which a recess is formed to receive the coated optical fiber 3 and clamp lids 21b and 23b that are opened and closed to press and fix the coated optical fiber 3 received in the recesses.

The fiber holders 21 and 23 are fixed to rotary supports 25 and 27 that protrude from the bases 9 and 11 toward the opposing sides. The rotary supports 25 and 27 are rotatable relative to the bases 9 and 11 through bearings (not illustrated) around an axial line (a horizontal axial line in the left-right direction of FIG. 1) of the coated optical fiber 3. According to rotation of the rotary supports 25 and 27, the coated optical fiber 3 held with the fiber holders 21 and 23 turns around the axial line.

The bases 9 and 11 of the fiber clamps 5 and 7 incorporate rotary bodies (not illustrated) that turn according to rotation of the rotary supports 25 and 27. The rotary bodies are turned by a motor (not illustrated) installed in any one of the bases 9 and 11 through a power transmission mechanism such as gear reduction. The rotary body in one of the bases 9 and 11 in which no motor is installed is connected to the other so that it may turn in synchronization with the rotary body driven and turned by the motor.

Accordingly, driving the motor results in synchronously turning the rotary supports 25 and 27 around the center axial line of the coated optical fiber 3, to turn the coated optical fiber 3 around the center axial line. The motor and power transmission mechanism such as gear reduction (not illustrated) and the rotary supports 25 and 27 form the third moving mechanism that is a rotary driving mechanism to turn the coated optical fiber 3 around the axial line thereof.

At a higher position of the base plate 1 above the coated optical fiber 3, there is arranged a coat removal blade 29 that is detachably attached to a front end part of a removal blade holder 31. The coat removal blade 29 has a wedge shape with an edge having a sharp sectional shape.

Figure 2:
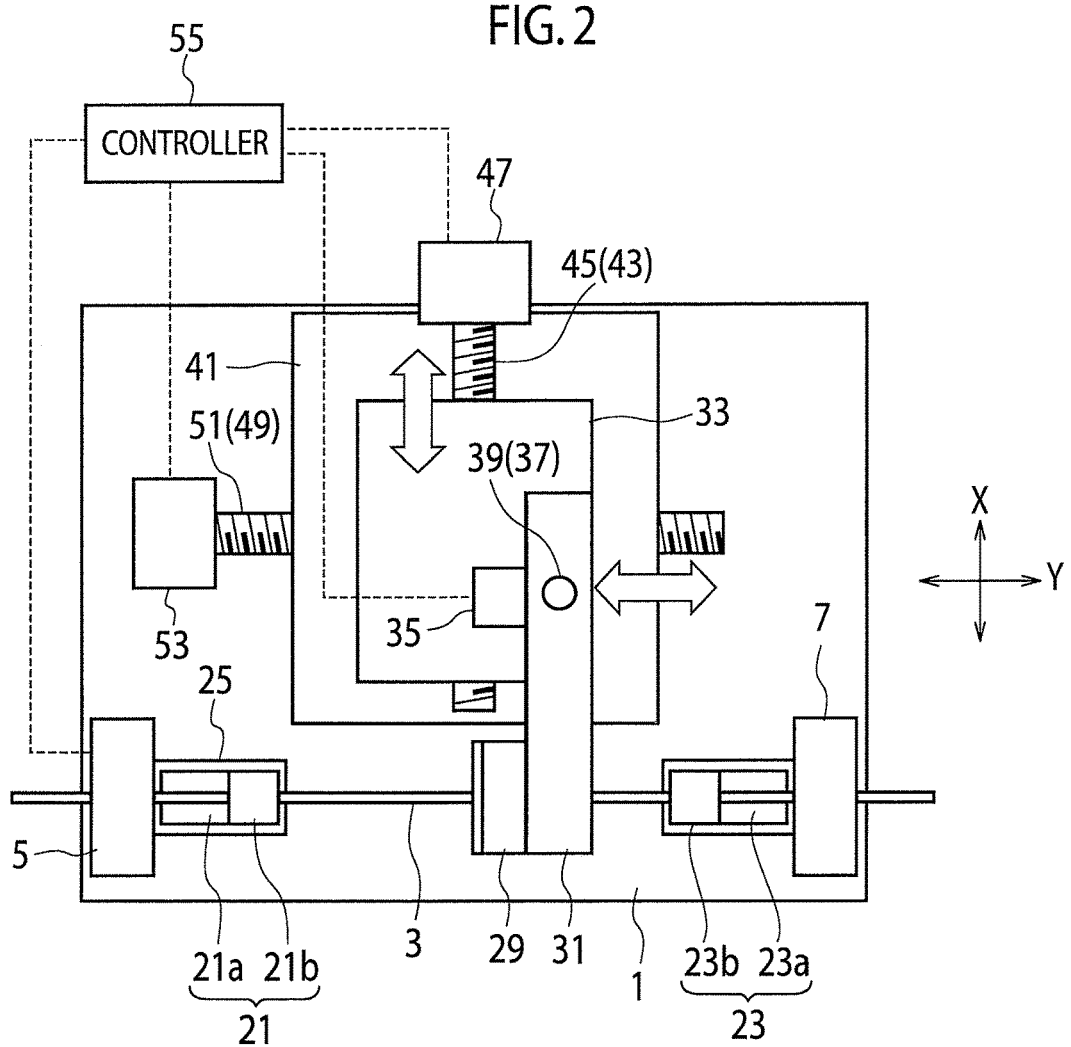
FIG. 2 is a plan view of the coat removing apparatus of FIG. 1.

As illustrated in FIG. 2, the coat removal blade 29 is wide and elongated in a horizontal direction (a top-bottom direction of FIG. 2) orthogonal to the axial line of the coated optical fiber 3. As illustrated in FIG. 1, the coat removal blade 29 is tilted to form an acute angle with respect to the coated optical fiber 3 that is horizontally arranged.

A base end of the removal blade holder 31 is attached through a guide rail (not illustrated) to an X-direction movable body 33, which moves in an X-direction in FIG. 2, so that the removal blade holder 31 is movable in a Z-direction in FIG. 1. The Z-direction movement of the removal blade holder 31 is achieved with the use of a ball screw 37 by a Z-direction motor 35 arranged on the X-direction movable body 33. Namely, the Z-direction motor 35 is driven to turn a threaded shaft 39 that is screwed in the Z-direction into a nut (female thread) of the removal blade holder 31, so that the removal blade holder 31 together with the coat removal blade 29 may move in the Z-direction with respect to the X-direction movable body 33.

Moving the removal blade holder 31 in the Z-direction results in moving the coat removal blade 29 in a vertical direction in FIG. 1 toward and away from the coated optical fiber 3. The Z-direction motor 35, ball screw 37, and the like form the first moving mechanism that moves the coat removal blade 29 in a direction intersecting the length direction, to press and bend the coated optical fiber 3.

The X-direction movable body 33 is attached to a Y-direction movable body 41 movable in the Y-direction in FIG. 2 and is movable in the X-direction. Moving the X-direction movable body 33 is achieved by use of a ball screw 43. Namely, a threaded shaft 45 extending in the X-direction is screwed into a nut (female thread) of the X-direction movable body 33 and is connected to an X-direction motor 47 arranged on the X-direction movable body 33. When the X-direction motor 47 is driven, the threaded shaft 45 turns and the X-direction movable body 33 moves on a guide rail (not illustrated) in the X-direction.

The Y-direction movable body 41 moves in the Y-direction in FIG. 2 with the use of a ball screw 49. Namely, a threaded shaft 51 extending in the Y-direction is screwed into a nut (female thread) of the Y-direction movable body 41 and is connected to a Y-direction motor 53 arranged on the base plate 1. When the Y-direction motor 53 is driven, the threaded shaft 51 turns and the Y-direction movable body 41 moves on a guide rail (not illustrated) in the Y-direction.

The Y-direction motor 53, ball screw 49, and the like form the second moving mechanism that moves the coat removal blade 29 in the length direction of the coated optical fiber 3 with respect to the coated optical fiber 3 bent by the above-mentioned first moving mechanism.

The Z-direction motor 35, X-direction motor 47, Y-direction motor 53, and the motor (not illustrated) arranged on any one of the bases 9 and 11 are controlled and driven by a control unit 55 as illustrated in FIG. 2. In FIG. 1, the X-direction movable body 33 and Y-direction movable body 41, the driving mechanisms to drive them, and the driving mechanism to drive the removal blade holder 31 are not illustrated.

Figure 3:
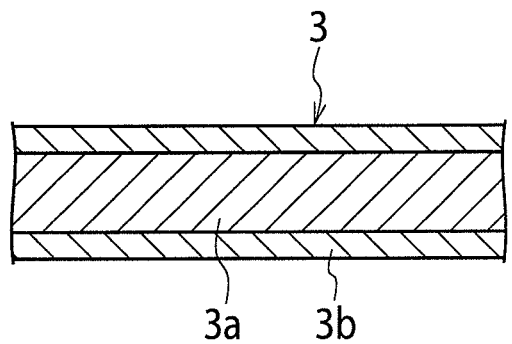
FIG. 3 is a sectional view of a coated optical fiber.

As illustrated in FIG. 3, the coated optical fiber 3 includes a glass fiber 3a such as a quartz-based optical fiber and the coat made of, for example, polyimide resin 3b coated around the glass fiber 3a. Here, the glass fiber 3a has a diameter of 125 μm (micrometers) and the polyimide resin 3b has an outer diameter (the diameter of the coated optical fiber 3) of 155 μm.

Operation will be explained. The coated optical fiber 3 is held with the pair of fiber holders 21 and 23. The spring 19 biases the base 11 to apply tension to the coated optical fiber 3 in the length direction. The tension applied is, for example, 0.49 N (newton) and a clamp-to-clamp distance W under the tension is 58 mm.

The coat removal blade 29 is set, by properly driving the Z-direction motor 35, X-direction motor 47, and Y-direction motor 53, to an initial state above the coated optical fiber 3. The Z-direction motor 35 is driven to descend the coat removal blade 29 so that the edge is pressed to the coated optical fiber 3. At this time, a descending amount H of the coat removal blade 29 (corresponding to a bending amount of the coated optical fiber 3) from the initial position is 350 µm.

Figure 4:
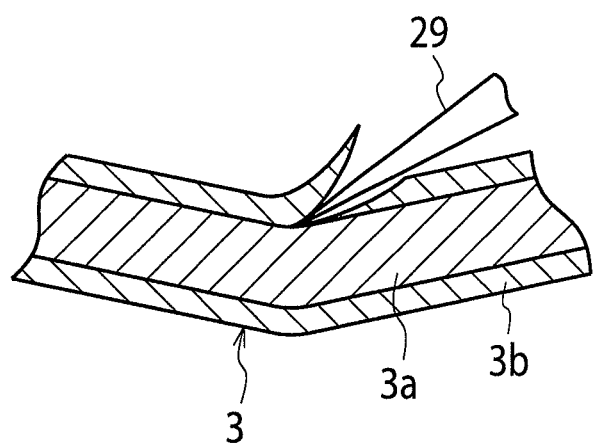
FIG. 4 is an operation explanatory view illustrating a state of removing a coat of the coated optical fiber with the coat removing apparatus of FIG. 1.

With this, as illustrated in FIG. 1, the coated optical fiber 3 downwardly bends, and in the bent state, the Y-direction motor 53 is driven to move the coat removal blade 29 in the edge direction, i.e., the left direction in FIG. 1. As a result, as illustrated in FIG. 4, the coat of the polyimide resin 3b is gradually removed.

At this time, a coat removing range is, for example, about 35 mm in the length direction of the coated optical fiber 3. After removing this range, the coat removal blade is ascended by driving the Z-direction motor 35. Thereafter, the Y-direction motor 53 is driven to return the coat removal blade 29 to the initial position. At the same time, the rotary supports 25 and 27 are turned by a predetermined angle such as about 90 degrees, so that a part of the coated optical fiber 3 that circumferentially corresponds to the coat-removed part and is still covered with the coat may face the coat removal blade 29 that is present above the part. In this state, the above-mentioned operation is carried out to remove the coat from the part.

The operation mentioned above is repeated to remove the coat from the whole circumference of the coated optical fiber 3 having a range of 35 mm in length. The angle of turning the coated optical fiber 3 is properly determined according to the diameter of the coated optical fiber 3. For example, the coated optical fiber 3 having a large diameter employs a smaller rotation angle than the coated optical fiber 3 having a small diameter, to increase the number of the coat removing operations carried out by moving the coat removal blade 29 in the Y-direction.

The coat removal blade 29 is wide in the X-direction as illustrated in FIG. 2. After one or a plurality of the coat removing operations in the Y-direction, the coat removal blade 29 at the initial position is slightly moved in the X-direction by driving the X-direction motor 47, so that the next coat removal operation is started with a new edge.

As mentioned above, the embodiment sets the tension applied to the coated optical fiber 3 to 0.49 N, the clamp-to-clamp distance W to 58 mm, and the pressing amount (descending amount) of the coat removal blade 29 to 350 µm. As a result, load (blade force) applied by the edge of the coat removal blade 29 to the coated optical fiber 3 becomes about $11.76 \times 10^{-3}$ N.

Figure 5:
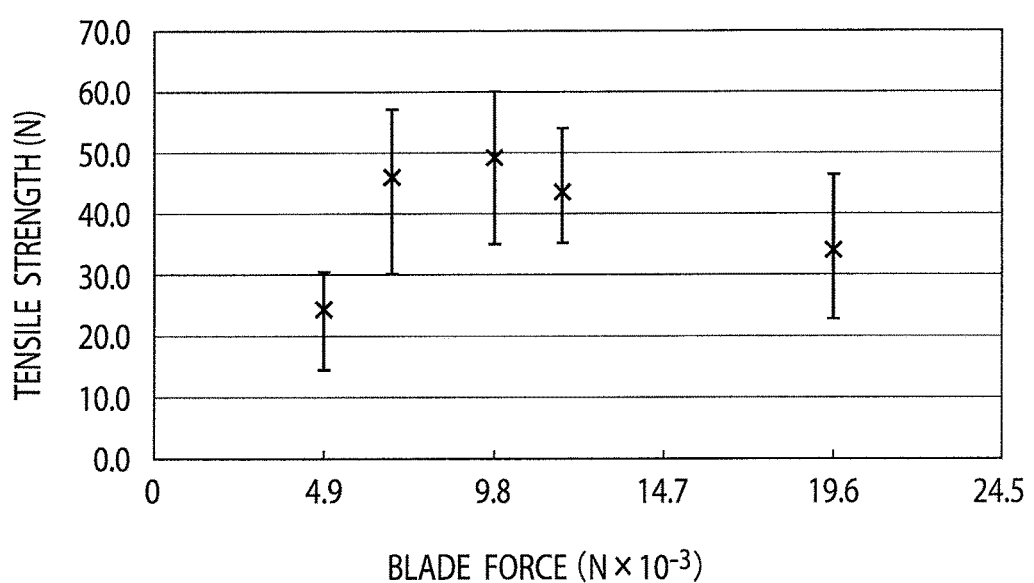
FIG. 5 is a view illustrating a correlation between blade force applied by a coat removal blade to the coated optical fiber in the coat removing apparatus of FIG. 1 and tensile strength of a glass fiber.

FIG. 5 illustrates tensile strength of the coat-removed glass fiber 3a with respect to the above-mentioned load (blade force). Data represented with a vertical segment contains a plurality of data pieces for the corresponding specific blade force and data represented with a mark x is an average of the data pieces. For example, a blade force of $9.8 \times 10^{-3}$ N involves a plurality of data pieces in a tensile strength range of about 35 to 60 N whose average is about 50 N.

The tensile strength of the glass fiber 3a is sufficient if it is 30.0 N or over. According to FIG. 5, the tensile strength of 30.0 N or over requires the blade force to be at least in a range of about $6.86 \times 10^{-3}$ N to about $11.76 \times 10^{-3}$ N. Accordingly, the embodiment sets the load (blade force) of the edge acting on the coated optical fiber 3 to about $11.76 \times 10^{-3}$ N, to secure the tensile strength of the glass fiber 3a after the removal of the coat.

As mentioned above, the embodiment presses the coat removal blade 29 to the coated optical fiber 3 that is in a tensile applied state, to bend the coated optical fiber 3. In this state, the embodiment moves the coat removal blade 29 in the length direction of the coated optical fiber 3, to remove the coat.

Unlike the related art that places the coated optical fiber 3 on a table, the embodiment has no need of precisely controlling the biting amount of the edge into the coat because the embodiment adjusts tension applied to the coated optical fiber 3 and the pushing amount (descending amount H) of the coat removal blade 29, to adjust blade force applied to the coated optical fiber 3 within a predetermined range. Accordingly, the embodiment is capable of removing the coat without causing the edge to strongly hit the glass fiber 3a in the polyimide resin 3b. The embodiment is simple in configuration and low in cost and is capable of preventing the strength of the glass fiber 3a from lowering after the removal of the coat.

The embodiment adjusts the tension applied in the length direction to the coated optical fiber 3 and the bending amount of the coated optical fiber 3, i.e., the moving amount H in the pressing direction of the coat removal blade 29 with respect to the coated optical fiber 3, to adjust the pressing load (blade force) applied by the coat removal blade 29 to the coated optical fiber 3. As a result, without highly precisely controlling the biting amount of the edge into the coat of the polyimide resin 3b, the embodiment is capable of preventing the edge from strongly hitting the glass fiber 3a in the polyimide resin 3b.

According to the embodiment, one of the pair of fiber clamps 5 and 7 is fixed and the other is moved in the length direction of the coated optical fiber 3. The tension mechanism 15 has the spring 19 to bias the movable fiber clamp 7 away from the fixed fiber clamp 5. The pushing configuration with the spring 19 is simple and low-cost to apply tension to the coated optical fiber 3.

The embodiment employs the rotary driving mechanism including the rotary supports 25 and 27 to turn the coated optical fiber 3 around the axial line thereof. The coat removal blade 29 is moved in the Y-direction to remove the coat from a circumferential partial area at a given location along the coated optical fiber 3. Thereafter, the coated optical fiber 3 is turned and the coat removal blade 29 is again moved in the Y-direction to sequentially remove the coat from another circumferential partial area at the given location. Consequently, the coat is removed from the whole circumference at the given location of the coated optical fiber 3.

INDUSTRIAL APPLICABILITY

The present invention is applicable to coat removing methods and coat removing apparatuses that remove a coat from a coated optical fiber.

Effects of Invention

According to the present invention, the coat removal blade is pressed to the coated optical fiber that is being tensioned, to bend the coated optical fiber. In this state, the coat removal blade is moved in the length direction of the coated optical fiber. Accordingly, without highly precisely controlling the biting amount of an edge of the coat removal blade into the coat or without causing the edge to strongly hit the optical fiber in the coat, the present invention is capable of removing the coat.

The invention claimed is:

1. A coat removing method of removing a coat of a coated optical fiber having a glass fiber covered by a coat, the coat made of polyimide resin thinner than a diameter of the glass fiber, comprising:
  (a) arranging only one coat removal blade having a wedge shape with an edge having a sharp sectional shape, the coat removal blade being wide and elongated in a direction orthogonal to a length direction of the coated optical fiber;
  (b) holding the coated optical fiber with a pair of holders at two locations spaced by a predetermined distance in the length direction;
  (c) applying tension in the length direction to the coated optical fiber held with the holders by a tension applying unit, by biasing one of the holders in a direction away from the other of the holders;
  (d) pressing the coat removal blade, which is tilted to form an acute angle with respect to the coated optical fiber, to the coated optical fiber in a tension-applied state by the tension applying unit in a direction intersecting the length direction, to bend the coated optical fiber;
  (e) moving the coat removal blade in the length direction along the coated optical fiber in a bent state, thereby removing the coat; and
  (f) repeating all of the steps (a) to (e), to remove the coat from a whole circumference of the coated optical fiber.

2. The coat removing method according to claim 1, wherein a pair of fiber clamps spaced by a predetermined distance are arranged on the left and right sides of a base plate, to serve as the holders to hold the coated optical fiber at two locations distanced away from each other in the length direction, and
wherein the tension applying unit includes a spring receiver and a spring being interposed between the spring receiver and a base of a fiber clamp of the pair of the fiber clamps, the spring serving as a resilient element to push the fiber clamp in a direction away from the other fiber clamp.

3. The coat removing method according to claim 1, wherein
a load of pressing the coated optical fiber applied by the coated removal blade is adjusted according to
the tension applied to the coated optical fiber in the length direction and
the bending amount of the coated optical fiber that corresponds to the moving amount of the coat removal blade in the direction of pressing the coated optical fiber.

\* \* \* \* \*